United States Patent [19]

Bricon

[11] 4,059,886

[45] Nov. 29, 1977

[54] HYDRAULIC ACTUATED GRAB BUCKET

[75] Inventor: Jean-Pierre Luc Bricon, Venissieux, France

[73] Assignee: International Harvester Company, Chicago, Ill.

[21] Appl. No.: 746,990

[22] Filed: Dec. 1, 1976

Related U.S. Application Data

[62] Division of Ser. No. 656,237, Feb. 9, 1976, Pat. No. 4,047,313.

[51] Int. Cl.[2] .............................................. C02F 3/60

[52] U.S. Cl. ....................................... 29/426; 294/70; 37/183 R

[58] Field of Search ................................. 37/183–188, 37/117.5; 29/426, 401 B, 148.3; 294/70, 88; 214/656, 657

[56] References Cited

U.S. PATENT DOCUMENTS 3,191,982 6/1965 Gioalard ................................ 294/70

3,814,471 6/1974 Coeurderoy ........................... 294/70

*Primary Examiner*—Milton S. Mehr
*Attorney, Agent, or Firm*—Ronald C. Kamp; Floyd B. Harman

[57] ABSTRACT

This grab bucket comprises a pair of shells or scoops pivoted to the lower portion of a frame structure and operatively connected to a vertical hydraulic cylinder and piston actuator of which the piston rod is held against translation in relation to said frame structure, the upper end of the cylinder of said actuator carrying the pivot pins of links connected to said pair of shells or scoops. The frame structure comprises on the one hand an upper rocker rigid with the piston rod of said hydraulic actuator and on the other hand a frame structure body detachable from said rocker. The shells themselves are detachable from the base of the hydraulic cylinder to permit the operation of the grab bucket not only as a digging bucket but also as a rehandling bucket after disassembling the frame structure body and connecting the links to the rocker.

2 Claims, 7 Drawing Figures

HYDRAULIC ACTUATED GRAB BUCKET

This is a division of application Ser. No. 656,237, filed Feb. 9, 1976, now U.S. Pat. No. 4,047,313.

FIELD OF THE INVENTION

The present invention relates in general to grab buckets for earthworks and has particular reference to an improved hydraulic actuated grab bucket of the type comprising a pair of conjugate shells or scoops pivotally mounted to the lower portion of a frame structure and adapted to be actuated by means of a vertical hydraulic cylinder and piston actuator having its piston rod held against translation in relation to said frame structure, the cylinder portion of said actuator carrying at its upper end the pivot pins of links operatively connected to said scoops. This grab bucket is adapted to be mounted on material handling or loading machines, hoisting machines, miscellaneous cranes, excavators, etc.

DESCRIPTION OF THE PRIOR ART

A grab bucket of the above-defined type is disclosed notably in the French Pat. No. 1,339,635 filed by the same Applicants on Aug. 28, 1962. The advantage deriving from the pivotal mounting of the conjugate scoops on the frame structure operatively connected to, for translation with, the piston rod of the hydraulic actuator is that on the one hand this grab bucket can be mounted by means of this piston rod alone, and on the other hand the frame structure supporting the complete grab bucket can be rotated through a full turn or 360° about the axis of said piston rod.

Notwithstanding these advantageous features, this prior art grab bucket can so far be operated only as a "digging" or excavator bucket, frequently referred to as an "earthmoving" grab bucket. A "digging" grab bucket is a bucket of the type wherein supplying fluid under pressure to the actuator causes the jaws or cutting edges of both scoops to dig or penetrate relatively deeply into the ground or material. A grab bucket of this character is used notably for excavation or digging works.

Besides these known "digging" grab buckets, so-called "rehandling", "retractable", "clamshell", "shovelling" or "dumping" buckets are also known; these buckets are characterized in that the jaws or cutting edges of the shells are caused upon actuation to move along a curved path yet substantially parallel to the ground, therefor without appreciably penetrating into the soil or material. These buckets are used chiefly for shovelling loose material on the ground or from a vehicle.

These two types of grab buckets are well known and marketed by most bucket manufacturers. However, they imply completely different structures, thus compelling manufacturers to provide two well-defined and different ranges of buckets, and the users to keep the two types of equipments, the substitution of one bucket type for another requiring in most instances the use of means such as disclosed in the German Pat. No. 1,189,248.

SUMMARY OF THE INVENTION

It is the essential object of the present invention to avoid these inconveniences by providing a grab bucket of the type broadly set forth hereinabove which, while preserving the principle features and advantages characterizing the grab bucket disclosed in the above-mentioned French Pat. No. 1,339,635, is convertible at will from the "digging" version to the "rehandling" version by a simple, fast operation without resorting to additional parts.

To this end, the grab bucket according to this invention comprises a frame structure consisting on the one hand of an upper rocket rigid with the piston rod of a fluid-operated cylinder-and-piston actuator and on the other hand of a lower body portion detachable from said rocker, the bucket scoops or shells being also detachable from said body and adapted to be pivotally mounted or connected to the lower end of the actuator cylinder to permit the operation of the grab bucket not only as a "digging" bucket but also as a "rehandling" bucket by simply disassembling the frame structure body portion and connecting the links to said rocker.

Therefore, the conversion from one mode of operation to the other mode of operation is accomplished by simply disassembling and reassembling the frame structure body, in conjunction with a change in the position of the various pivot pins. In the "digging" bucket version the shells are pivoted to the lower portion of the frame structure body, the links are connected to the top of the actuator cylinder and the rocker is inoperative; in the "rehandling" bucket version the frame structure body is disassembled, and upon reassembly, the shells are pivoted to the lower end of the actuator cylinder, and the links are pivotally connected to the upper rocker. This conversion can be accomplished very rapidly and therefore the operator can perform two very different types of works by using a single bucket.

To carry out the invention it is required that either the links can be pivoted to the top of the vertical actuator cylinder, or the shells can be pivoted to the lower end of the cylinder. Now various solutions may be contemplated for achieving this dual result.

In a first form of embodiment the actuator cylinder carries a pair of pivot pins in the vicinity of only one end therof, the two ends of the cylinder being closed by detachable interchangeable covers, one cover being adapted to receive the piston therethrough to permit the turning over of the cylinder and therefore the positioning of said pivot pins either at the top or at the bottom thereof, according as the grab bucket is to be operated in the "digging" version or in the "rehandling" version.

In a second form of embodiment the actuator cylinder carries a pair of pivot pins in the vicinity of each end, the upper pivot pins being used in the "digging" version and the lower pivot pins in the "rehandling" version.

In a third form of embodiment the actuator cylinder carries a pair of detachable pivot pins adapted to be positioned either in the vicinity of the upper end of the cylinder or in the vicinity of the lower end thereof, according as the grab bucket is to be operated in the "digging" version or in the "rehandling" version.

The above disclosed second and third forms of embodiment make it possible to dispense with the turning over of the actuator cylinder which is required in the first form of embodiment.

According to a specific form of embodiment of this invention the body of the frame structure is detachably secured to the upper rocker by means of screws. Advantageously, this detachable frame structure body comprises two solid vertical portions, respectively front and rear wall portions, carrying at their upper ends horizontal flanges in which passage holes for the rocker fastening screws are formed, the side and top wall portions of this body being open. The dimensions of these open wall portions are such that they permit the passage of ears carried by the actuator cylinder and engageable by the pivot pins, so that the frame structure body can be separated completely after releasing the screws for fastening same to the rocker.

DESCRIPTION OF THE DRAWINGS

A complete understanding of the invention may be obtained from the foregoing and following description thereof taken together with the appended drawings, wherein.

DESCRIPTION OF THE PREFERRED EMBODIMENT

Figure 2:
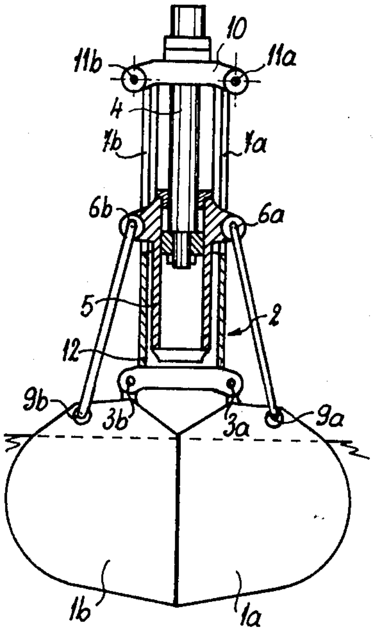
FIGS. 1 and 2 are front elevational and part-sectional views showing the grab bucket according to this invention in the "digging" version, in the open and closed positions, respectively.
Figure 1:
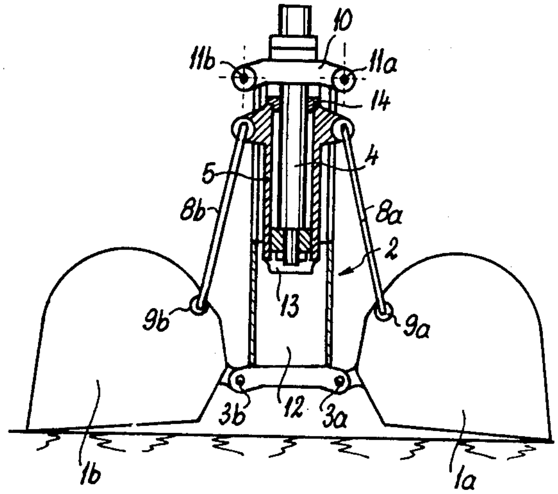

Reference will be made firstly to FIGS. 1 and 2 of the drawings, showing the "digging" grab bucket version of the present invention. In this version the grab bucket comprises in a manner already known per se a pair of symmetrical shells or scoops 1*a* and 1*b* both pivoted by means of pivot pins 3*a* and 3*b* to the lower portion of a frame structure designated in general by the reference numeral 2. These shells 1*a* and 1*b* are adapted to be actuated by means of a vertical cylinder-and-piston actuator housed within the frame structure 2. The piston rod 4 of this actuator is adapted to rotate freely but held against axial translation in relation to the frame structure 2, and comprises an upper extension through which the bucket assembly can be fastened to a hoisting or like apparatus (not shown). The actuator cylinder 5 is slidably mounted in the frame structure 2 and carries at its upper end diametrically opposed lugs 6*a*, 6*b* extending through relevant lateral apertures 7*a* and 7*b* respectively of frame structure 2, these lugs 6*a* and 6*b* being connected to the shells 1*a* and 1*b* through the medium of links 8*a* and 8*b*, respectively, pivoted in turn on the one hand to said ears 6*a*, 6*b* and on the other hand to the shells 1*a*, 1*b* being designated by the reference symbols 9*a* and 9*b*, respectively.

According to this invention, the frame structure 2 consists of two detachably assembled portions. The upper portion 10, of rocker configuration, is rigid with the piston rod 4 of the fluid-operated actuator and carries a pair of lateral pivot pins 11*a* and 11*b*. The lower portion 12 of said frame structure 2 is detachable and comprises apertures 7*a*, 7*b* opening at the top thereof, and also lower lugs to which the shells 1*a* and 1*b* are pivoted. Moreover, these shells 1*a* and 1*b* are also adapted to be disassembled from the lower or body portion 12 of the frame structure 2 which will be referred to presently as the "frame structure body". On the other hand, the links 8*a* and 8*b*, although constantly pivoted to the shells 1*a* and 1*b* about the relevant pivot pins 9*a* and 9*b*, can be detached from the ears 6*a* and 6*b* and pivoted to the pins 11*a* and 11*b* of upper rocker 10.

In the form of embodiment illustrated in the drawings the actuator cylinder is closed at its opposite ends by a pair of interchangeable detachable covers 13 and 14. The lower end cover 13 is of simple circular, solid configuration and the upper gland cover 14 of annular configuration is adapted to receive the piston rod 4 of the actuator therethrough. Due to the provision of these detachable and interchangeable component elements the cylinder 5 can be turned upside down and its ears 6*a* and 6*b* can thus be disposed at will at the top or bottom thereof.

Figure 5:
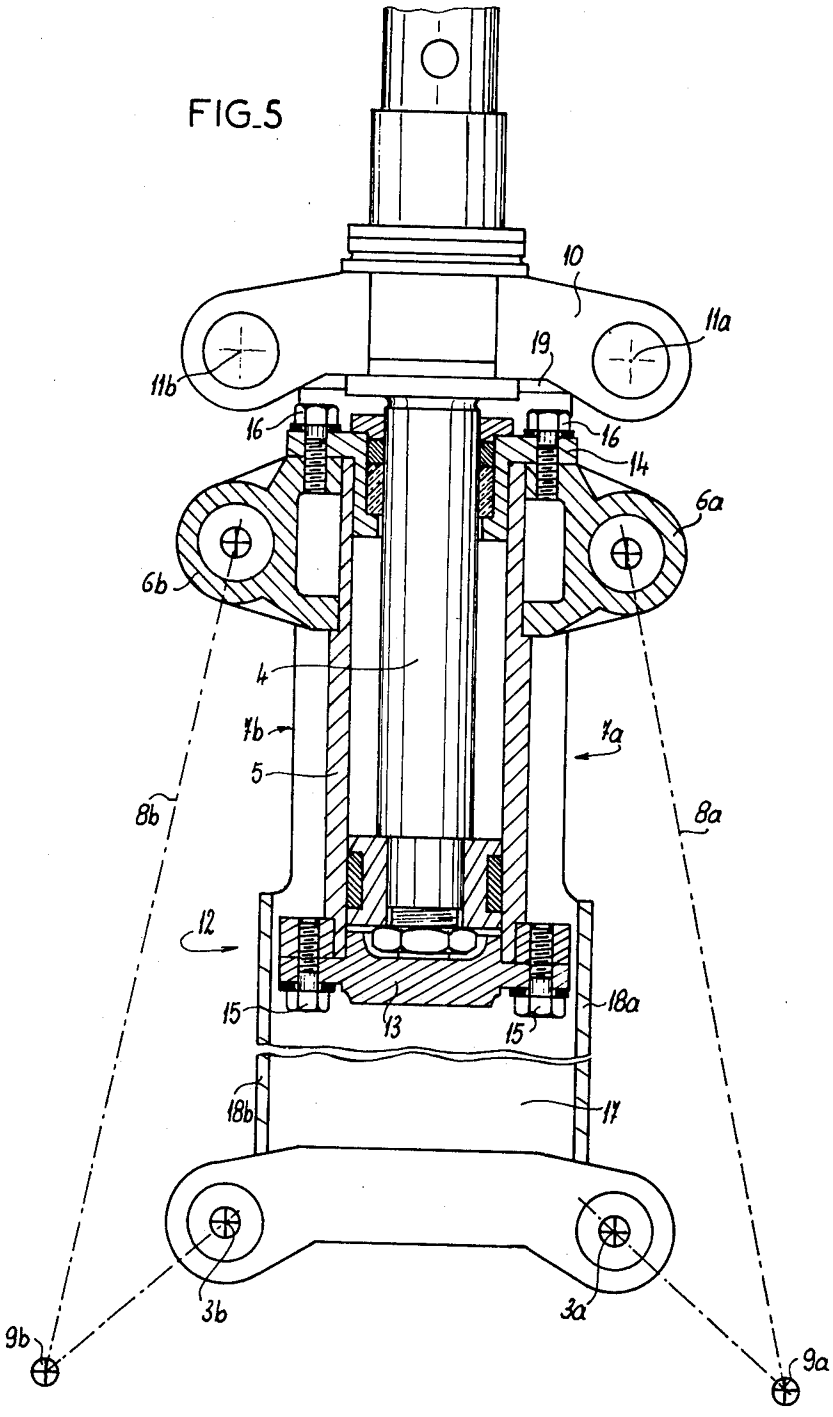
FIGS. 5 and 6 are front elevational and part-sectional views showing on a larger scale constructional details of the grab bucket as shown in FIGS. 1 and 4, respectively.
Figure 6:
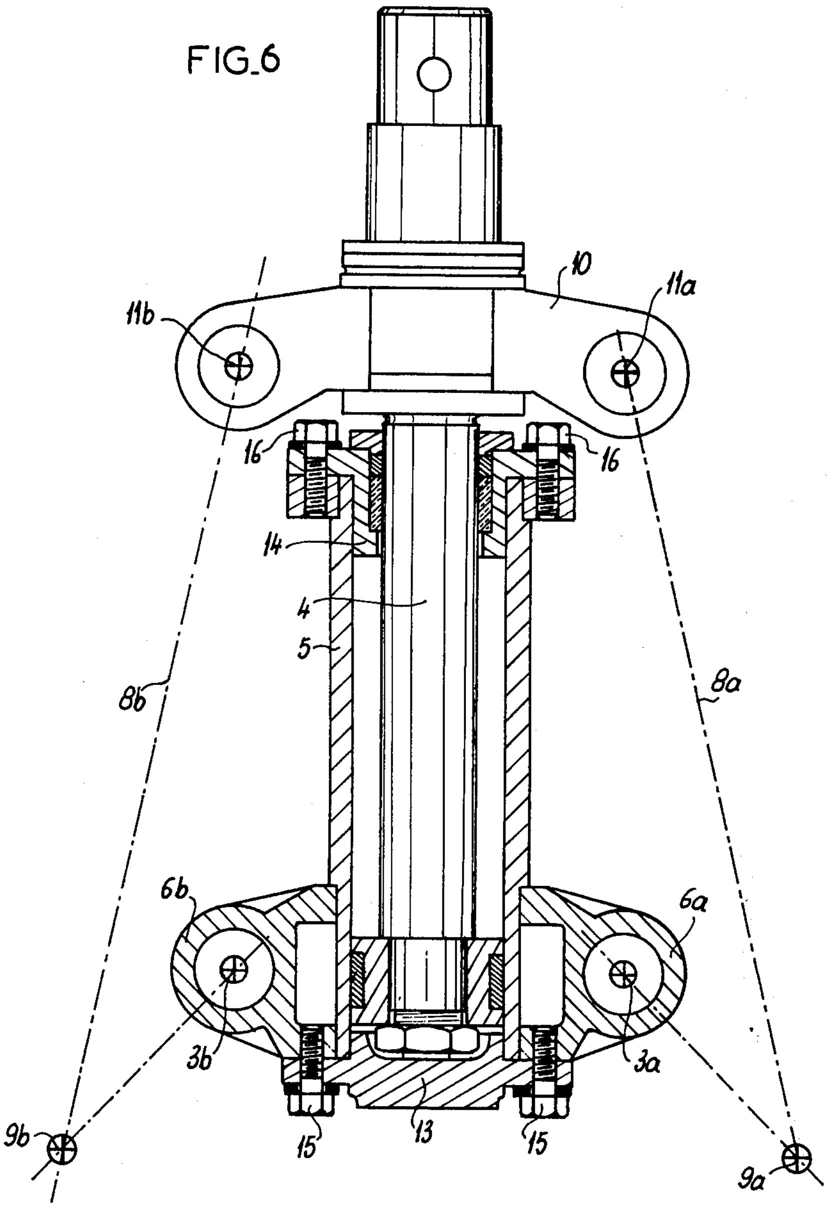

As shown more in detail in FIGS. 5 and 6, the lower cover 13 is secured to the cylinder 5 of the actuator by means of a set of screws 15, and the top cover is secured to this cylinder 5 by means of another set of screws 16.

Figure 7:
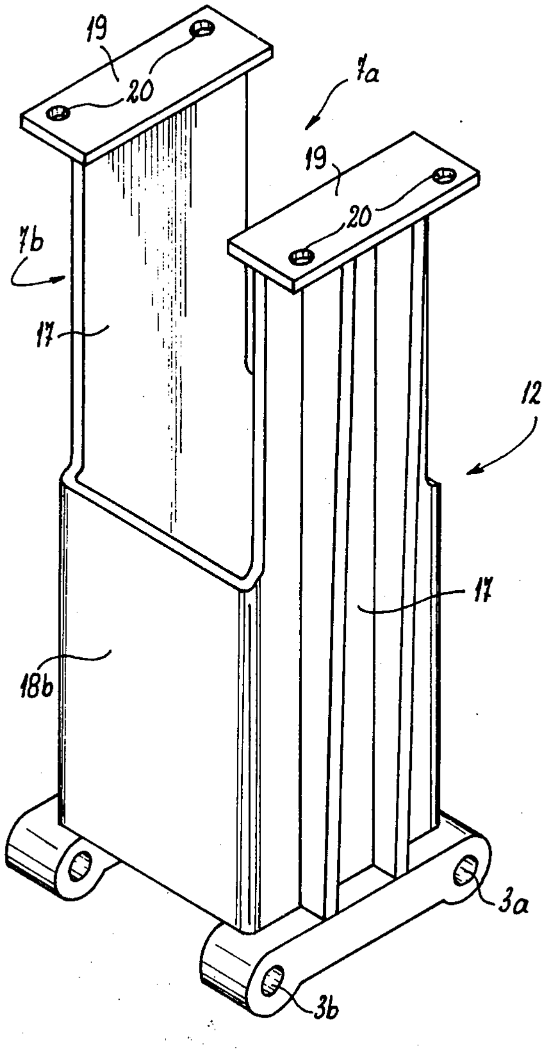
FIG. 7 is a perspective view showing typical form of embodiment of the detachable frame structure body.

The particular shape of the frame structure body 12 is clearly visible in FIG. 7. This box-like body 12 comprises two solid vertical front and rear walls 17, and two vertical lateral walls 18*a*, and 18*b* extending from the bottom to approximately mid-height of the body 12 to provide the corresponding lateral apertures 7*a* and 7*b*. The top of each solid wall 17 comprises an integral horizontal flange 19 in which holes 20 are formed to permit the passage of screws (not shown) for securing the body 12 to the rocket 10. The upper central portion of this body 12, i.e. between the parallel flanges 19, is completely free.

Figure 3:
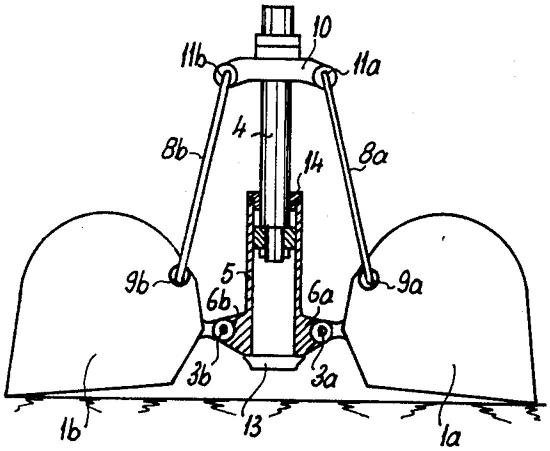
FIGS. 3 and 4 are front elevational and part-sectional views showing the same grab bucket in the the "rehandling" version, in the open and closed positions, respectively.
Figure 4:
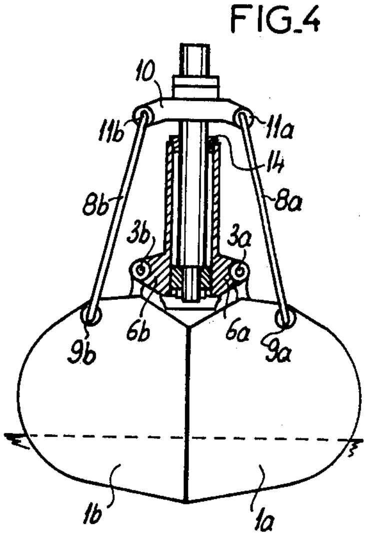

The various possibilities of disassembling the component elements described hereinabove permit of converting the grab bucket of FIGS. 1 and 2, operating according to the above-defined principle of a "digging" bucket, into a "rehandling" or pickup grab bucket, as shown in FIGS. 3 and 4, respectively.

Considering first the version illustrated in FIGS. 1 and 2, and also in FIG. 5 on a larger scale, the frame stucture body 12 remains rigidly secured to the rocker 10 by means of the aforesaid screws, the pivot pins 11*a* and 11*b* of the rocker 10 are not used and the shells 1*a* and 1*b* are pivoted about pivot pins 3*a* and 3*b*, but these are fixed since they are rigid with the body 12.

Therefore, when the actuator is supplied with fluid under pressure in the direction corresponding to the downward stroke of cylinder 5, this movement is transmitted via links 8*a* and 8*b* to the shells 1*a* and 1*b* which are thus caused to rotate about said fixed pivot pins 3*a* and 3*b*. Now assuming that initially the cutting edges of the shells are level with the ground surface (FIG. 1), at the end of the stroke these edges will have penetrated or dug relatively deeply into the ground (FIG. 2), and the grab bucket will operate according to the above-defined principle of a "digging" bucket.

The version illustrated in FIGS. 3 and 4, and on a larger scale in FIG. 6, is obtainable by bringing the following sequential changes to the assembly:

i. Both shells 1*a* and 1*b* are detached from the lugs of the frame stucture body 12 to which they are pivoted, and the upper ends of links 8*a* and 8*b* are disconnected from the corresponding ears 6*a* and 6*a* at the upper portion of actuator cylinder 5.

ii. The frame stucture body 12 is disassembled from the rocker 10 after releasing the screws securing said body to the rocker. The lateral apertures 7*a*, 7*b* and the upper aperture of the body 12 permit of removing this body 12 notwithstanding the presence of the cylinder 5 and the ears 6*a*, 6*b* thereof.

iii. The covers 13 and 14 of cylinder 5 are removed after releasing the screws 15 and 16. The top cover 14 remains on the piston rod 4 of the actuator. The cylinder 5 is extracted and then turned upside down and fastened to the gland cover 14. Thus, the ears 6*a* and 6*b* are now at the lower portion of the cylinder. Finally, the lower end cover 13 is positioned again at the bottom end of cylinder 5.

iv. The shells 1*a* and 1*b* are pivoted through their pivot pins 3*a* and 3*b* to the ears 6*a* and 6*b*, and the upper ends of links 8*a* and 8*b* are pivoted to the rocker 10 by means of pivot pins 11*a* and 11*b*.

Now it is clear that the body 12 of the frame structure is not used in this second version and that the shells 1*a* and 1*b* are mounted in a different manner, the upper ends of links 8*a*, 8*b* being pivoted to fixed pivot pins 11*a* and 11*b* while the shells are pivoted about vertically movable pivot pins 3*a*, 3*b*.

Thus, when fuid under pressure is fed to the actuator in the direction to lift its cylinder 5, this upward movement is transmitted to the pivot pins 3*a*, 3*b* of shells 1*a*, 1*b* which will thus pivot about these pins 3*a*, 3*b l since the axes 9a*, 9*b* of the pivotal connection between the shells and the links remain at a substantially constant level. Assuming that initially the cutting edges of the shells are substantially level with the ground surface (FIG. 3), at the end of the cylinder stroke these cutting edges are but only moderately sunk into the soil (FIG. 4) and the grab bucket will obviously operate according to the principle of a "rehandling" or pick-up bucket.

This invention is intended mainly for grab buckets for use in earthworks, but it is also applicable to grab buckets of any shape and dimensions, designed for handling coal, earth, sugarbeets, wood, etc. The term "shell" or "scoop" as used herein designates the two movable halves of the bucket but does not refer to any specific, well-defined shape, since the shells may consist of or comprise bowls, forks, jaws, etc.

It will readily occur to those conversant with the art that the present invention should not be construed as being strictly limited by the specific form of embodiment of grab bucket described hereinabove with reference to the attached drawings, which is given by way of illustration, not of limitation; in fact, many modifications and changes may be brought thereto without departing from the basic principle of the invention; thus, notably, the conversion of a "digging" grab bucket into a "rehandling" grab bucket may be obtained by using means other than the upside-down turning of the actuator cylinder 5 for bringing the ears 6*a*, 6*b* to their lower portion. A particularly simple solution permitting of avoiding the steps of disassembling and turning over of cylinder 5 consists for example in providing at the bottom thereof another pair of ears similar to said ears 6*a*, 6*b*, this other pair of ears constituting additional pivot means not used in the "digging" bucket version but readily available for pivoting the shells 1*a* and 1*b* in the "rehandling" or pickup version.

Another solution requiring a disassembling step but preventing the turning over of the actuator cylinder 5 consists in providing detachable ears 6*a*, 6*b* adapted to be positioned either in the vicinity of the upper end of the cylinder or in the vicinity of the bottom thereof, according as the grab bucket is to be used as a "digging" bucket or as a "rehandling" or pickup bucket.

The embodiments of the invention in which an exclusive property or priviledge is claimed are defined as follows:

1. A method of converting a digging bucket suspended from a frame to a rehandling bucket, said digging bucket having a pair of mating shells, each of which has inner and outer pivot connections, a piston including a rod affixed to said frame, a cylinder reciprocably mounted upon and sealingly engaging said rod and piston, link means pivotally connected between said cylinder and said outer pivot connections and pivot means carried by said frame and pivotally connecting said inner pivot connections to said frame; said method comprising the steps of:

disconnecting said link means from said cylinder;

disconnecting said pivot means from said inner pivot connections;

connecting said inner pivot conections to said cylinder; and, connecting said link means to said frame.

2. A method of converting a digging bucket suspended from a frame to a rehandling bucket, said digging bucket having a pair of mating shells, each of which has inner and outer pivot connections, a piston including a rod affixed to said frame, a cylinder reciprocably mounted upon and sealingly engaging said piston, said cylinder having a first end with pivot lugs extending outward therefrom and a second end, a gland cover sealingly engaging said rod and detachably secured to said first end of said cylinder, an end cover detachably secured to and sealing the second end, a frame member detachably secured to said frame and extending around said cylinder; said frame member having lateral apertures through which said pivot lugs extend, link means connected between said pivot lugs and said outer pivot connections on each shell and pivot pins connecting said inner pivot connections to the lower end of said frame member; the method comprising the steps of:

disconnecting said link means from said pivot lugs;

removing said pivot pins;

detaching said frame member from said frame and removing said frame member;

detaching said covers from said cylinder;

reversing said cylinder end for end on said piston;

securing said gland cover to said second end of said cylinder and said end cover to said first end;

connecting said inner pivot connections to said pivot lugs; and connecting said link means to said frame.

* * * * *